United States Patent [19]

Goel

[11] Patent Number: 4,891,416

[45] Date of Patent: Jan. 2, 1990

[54] NOVEL THIOETHER AMIDE DIOLS AND POLYURETHANE POLYMERS THEREFROM

[75] Inventor: Anil B. Goel, Marlboro, N.J.

[73] Assignee: Ashland Oil, Inc., Ashland, Ky.

[21] Appl. No.: 264,650

[22] Filed: Oct. 31, 1988

Related U.S. Application Data

[62] Division of Ser. No. 852,588, Apr. 16, 1986, Pat. No. 4,804,781.

[51] Int. Cl.$^4$ .................... C08G 18/32; C07C 103/00
[52] U.S. Cl. ...................................... 528/85; 564/154; 260/402.5
[58] Field of Search ..................... 564/154; 260/402.5; 528/45

[56] References Cited

U.S. PATENT DOCUMENTS

| | | | |
|---|---|---|---|
| 4,665,229 | 5/1987 | Goel | 528/374 |
| 4,698,416 | 10/1987 | Goel et al. | 528/389 |

*Primary Examiner*—Harold D. Anderson
*Assistant Examiner*—Dennis R. Daley
*Attorney, Agent, or Firm*—John F. Jones

[57] ABSTRACT

A process for preparing a polyurethane comprising reacting a thioether amide diol prepared by reacting a bicyclic amide acetal with hydrogen sulfide at a temperature in the range of from 20° to 200° C. wherein a mole ration of bicyclic amide acetal to hydrogen sulfide is in the range of from about 1:1 to about 2:1 is described.

4 Claims, No Drawings

NOVEL THIOETHER AMIDE DIOLS AND POLYURETHANE POLYMERS THEREFROM

This is a division of my copending U.S. patent application Ser. No. 852,588, filed Apr. 16, 1986, now U.S. Pat. No. 4,804,781.

The present invention relates to novel thioether amide diols, the process for preparing them by the reaction of bicyclic amide acetals with hydrogen sulfide and to the reaction of these novel thioether amide diols with polyisocyanates to form polyurethane polymers.

The reaction of bicyclic amide acetals with thiols has been described in copending U.S. patent application Ser. No. 702,180, Filed 2/14/85.

I have discovered that the reaction of bicyclic amide acetals with hydrogen sulfide produces new thio either amide diols which can be used to produce flexible polyurethane polymers by reaction with polyisocyanates and that such polyurethane polymers are useful in applications such as adhesives and coatings, and the like.

The bicyclic amide acetals useful in this invention include those having the formula I

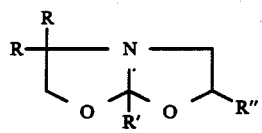

wherein R, R' and R" independently represent a member selected from the group consisting of hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms and an aryl ether group having from 6 to 12 carbon atoms.

The reaction which produces the novel thioether amide diols of this invention is illustrated in the following equation.

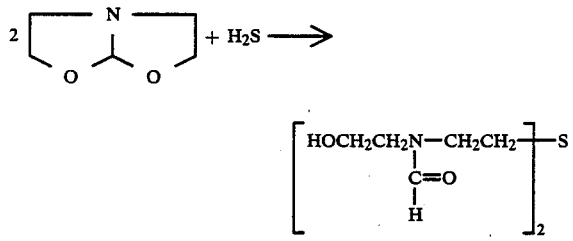

The polyisocyanates useful in preparing the polyurethanes of this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene, diisocyanate, hexamethylene diisocyanate, hexamethylene diisocyanate trimer, tetraethylene diisocyanate, pentamethylene diisocyanate, propylene-1, 3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. pat. Nos. 3,350,362 and 3,382,215. Polyisocyanates which are polymeric in nature including isocyanate perpolymers of all types are included in this invention.

Although the reaction between the bicyclic amide acetal and hydrogen sulfide proceeds smoothly at room temperature, a wide range of temperatures can be used for the process. Temperatures in the range of from 20° to 200° C. may be used. The thio ether amide diol products of the reaction of bicyclic amide acetals with hydrogen sulfide are compatible with other low molecular weight polyols such as polyether polyols, polyester polyols, and the like and their mixtures can be also used in the preparation of polyurethanes by reaction with polyisocyanates. In the reaction of bicyclic amide acetals with hydrogen sulfide it is preferred that the mole ratio of bicyclic amide acetal to hydrogen sulfide be in the range of from about 1:1 to about 2:1.

The invention is further illustrated in the following representative examples.

EXAMPLE 1

A slow stream of hydrogen sulfide gas was bubbled at room temperature into 25 g of a stirred liquid bicyclic amide acetal of formula I in which R and R" are hydrogen and R' is methyl. The reaction temperature was maintained below 30° C. and the stirring was continued for three hours with continued addition of hydrogen sulfide. A weight gain of 3.6 g was observed at the end of this time and the reaction mixture turned into a viscous pale colored liquid. The bubbling of hydrogen sulfide was stopped and the reaction mixture was heated at 60° C. for two hours under reduced pressure to remove residual hydrogen sulfide. The viscous liquid product was analyzed by GLC and it was found that essentially complete conversion of the bicyclic amide acetal had taken place. The infrared spectrum of the product showed strong bands at 3375 cm$^{-1}$ (hydroxy group) and 1620 cm$^{-1}$ (amide group). The hydroxy value was found to be 516.

EXAMPLE 2

A slow stream of hydrogen sulfide was bubbled into 60.5 g of stirred bicyclic amide acetal as in Example 1 and the reaction was maintained at 70°-80° C. for about 4½ hours. The resulting viscous liquid was analyzed by GLC which showed the complete disappearance of the starting bicyclic amide acetal. The viscous liquid product was degassed on a rotary evaporator under reduced pressure. Infrared analysis of the product showed strong bands at 3370 cm$^{-1}$ (hydroxyl groups) and 1620 cm$^{-1}$ (amide groups). The hydroxy number of the product was found to be 424 and the acid value was 0.1.

EXAMPLE 3

The procedure of Example 2 was followed using 158.2 g of the bicyclic amide acetal. The reaction was allowed to proceed for six hours and the resulting liquid was found to be free of the bicyclic amide acetal and to have a hydroxy number of 410. The diol product was found to be miscible with propylene glycol and dipropylene glycol.

EXAMPLE 4

The procedure of Example 2 was followed using 20 g of a bicyclic amide acetal of formula I wherein R is hydrogen, R' is ethyl and R" is CH$_2$OC$_6$H$_5$ and the reaction was continued for six hours at 80° C. to give a viscous liquid product which was found by infrared analysis to have strong bands at 3372 cm$^{-1}$ (hydroxyl) and 1620 cm$^{-1}$ (amide).

EXAMPLE 5

A solution of 20 g of dipropylene glycol, 14.5 g of the diol of Example 3 and 0.3 g of N,N',N"-tris(dimethyl amino propyl) hexahydro triazine was degassed on a rotary evaporator and mixed rapidly with 63 g of degassed liquid carbodiimide groups containing methylene bis(phenyl isocyanate) (NCO functionality of 2.3). The liquid was poured into a mold prepared by two silicone mold release coated parallel glass plates held apart by ⅛" spacers and kept at 100° C. Polymerization occurred within a minute. The polymer was postcured at 130° C. for 30 minutes. The physical properties of the polymer were found to be notched izod impact strength (ASTM D 256) of 0.65 foot pounds/inch of notch, heat distortion temperature (ASTM D 648) of 115° C., yield strength (ASTM D 790) of 17,957 psi and a flexural modulus of 346,184 psi.

EXAMPLE 6

The procedure of Example 5 was followed using 20 g of dipropylene glycol, 20 g of the polyol of Example 3, 0.35 g of N,N',N"-tri(dimethyl amino proply) hexahydro triazine and 70 g of the polyisocyanate of Example 5. The solid polymer product had a notched izod impact strength of 0.75 foot pounds/inch of notch, a heat distortion temperature of 119° C., a yield strength of 21,925 psi and a flexural modulus of 357,452 psi.

EXAMPLE 7

The procedure of Example 5 was followed using 12 g of propylene glycol, 10 g of dipropylene glycol, 10 g of the diol of Example 3, 14 g of acrylonitrile grafted poly(propylene oxide) triol capped with ethylene oxide (approximate molecular weight of 6000), 0.6 g of N,N',N"-tris(dimethyl amino propyl) hexahydro triazine and 96 g of the polyisocyanate described in Example 5. The resulting opaque polymer obtained without the postcuring showed a notched izod impact strength of 1 foot pound/inch of notch, a heat distortion temperature of 115° C., a flexural strength of 15,173 psi and a flexural modulus of 342,036 psi.

I claim:

1. A thioether amide diol composition produced by the process comprising reacting a bicyclic amide acetal with hydrogen sulfide at a temperature in the range of from 20° to 200° C. wherein the mole ratio of bicyclic amide acetal to hydrogen sulfide is in the range of from about 1:1 to about 2:1.

2. The composition of claim 1 wherein the bicyclic amide acetal is one of formula

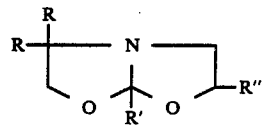

wherein R, R' and R" independently represent a member selected from the group consisting of hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms and an aryl ether group having from 6 to 12 carbon atoms.

3. The composition of claim 2 wherein the bicyclic amide acetal is one in which R and R" are hydrogen and R' is methyl.

4. The composition of claim 2 wherein the bicyclic amide acetal is one in which R is hydrogen, R' is ethyl and R" is CH$_2$OC$_6$H$_5$.

* * * * *